United States Patent
Oyama

(10) Patent No.: US 12,525,015 B2
(45) Date of Patent: Jan. 13, 2026

(54) IMAGING DEVICE AND EQUIPMENT

(71) Applicant: CANON KABUSHIKI KAISHA, Tokyo (JP)

(72) Inventor: Tohru Oyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/603,342

(22) Filed: Mar. 13, 2024

(65) Prior Publication Data
US 2024/0312210 A1    Sep. 19, 2024

(30) Foreign Application Priority Data

Mar. 14, 2023 (JP) .................................. 2023-039730

(51) Int. Cl.
*G06V 20/40*    (2022.01)
*G06T 7/20*    (2017.01)
*G06V 10/60*    (2022.01)

(52) U.S. Cl.
CPC ................ *G06V 20/44* (2022.01); *G06T 7/20* (2013.01); *G06V 10/60* (2022.01)

(58) Field of Classification Search
CPC ....... H04N 25/707; H04N 25/47; H04N 7/188
See application file for complete search history.

(56) References Cited

U.S. PATENT DOCUMENTS

| | | | |
|---|---|---|---|
| 2006/0161960 A1* | 7/2006 | Benoit | G08B 13/19667 348/E7.086 |
| 2010/0245809 A1* | 9/2010 | Andreou | H10F 39/802 257/292 |
| 2016/0057366 A1* | 2/2016 | Lee | H04N 25/47 348/302 |
| 2020/0410272 A1 | 12/2020 | Seo | |

(Continued)

FOREIGN PATENT DOCUMENTS

| | | |
|---|---|---|
| JP | 2019-134202 A | 8/2019 |
| JP | 2020-136958 A | 8/2020 |

(Continued)

OTHER PUBLICATIONS

Feng Y, Goulding-Hotta N, Khan A, Reyserhove H, Zhu Y. Real-Time Gaze Tracking with Event-Driven Eye Segmentation. CoRR abs/2201.07367 (2022). arXiv preprint arXiv:2201.07367 (Year: 2022).*

(Continued)

*Primary Examiner* — Clifford Hilaire
(74) *Attorney, Agent, or Firm* — Venable LLP

(57) ABSTRACT

An imaging device includes a pixel portion that includes a plurality of unit pixels and is configured to detect as an event signal a change in a light intensity of each of the unit pixels, an event readout portion configured to read out the event signal from the pixel portion, an output portion configured to output, regarding at least one region relating to the event signal of the pixel portion, motion information relating to (Continued)

motion of the at least one region, and a determination portion configured to determine a predicted region after a change in the at least one region, the predicted region being predicted based on the motion information. The event readout portion is configured to read out the event signal from a unit pixel included in the determined predicted region.

18 Claims, 9 Drawing Sheets

(56) References Cited

U.S. PATENT DOCUMENTS

| | | |
|---|---|---|
| 2021/0067722 A1 | 3/2021 | Bostamam et al. |
| 2021/0171061 A1* | 6/2021 | Etesami ............ B60W 30/0956 |
| 2022/0070392 A1 | 3/2022 | Izawa et al. |
| 2022/0108551 A1* | 4/2022 | Athreya ................ H04N 25/47 |
| 2022/0232176 A1 | 7/2022 | Naganuma |
| 2022/0264035 A1 | 8/2022 | Berner |
| 2022/0400219 A1 | 12/2022 | Naito |
| 2023/0262349 A1 | 8/2023 | Kitano |
| 2023/0319437 A1 | 10/2023 | Miyabe et al. |
| 2024/0297851 A1* | 9/2024 | Suess ..................... H04N 25/47 |

FOREIGN PATENT DOCUMENTS

| | | |
|---|---|---|
| JP | 2022-073228 A | 5/2022 |
| JP | 2022-188990 A | 12/2022 |
| WO | 2022/009807 A1 | 1/2022 |

OTHER PUBLICATIONS

Search Report dated Jun. 10, 2024, in European Patent Application No. 24162536.7.

Yu Feng et al., Real-Time Gaze Tracking with Event-Driven Eye Segmentation, 2022 IEEE Conference on Virtual Reality and 3D User Interfaces (VR) (2022).

Communication dated Sep. 8, 2025, in European Patent Application No. 24162536.7.

* cited by examiner

TIME t-1

TIME t+1

9191

IMAGING DEVICE AND EQUIPMENT

BACKGROUND OF THE INVENTION

Field of the Invention

The technology of the present disclosure relates to an event-based imaging device and an equipment.

Description of the Related Art

With the recent proliferation of the Internet of Things (IoT), artificial intelligence (AI), autonomous driving, and the like, an event-based sensor has been proposed as an image sensor that consumes less power and operates faster than a conventional sensor. An event-based sensor is also called a dynamic vision sensor.

This sensor monitors changes in the light intensity of each pixel in a two-dimensional pixel array, and detects changes as events. An event-based sensors can detect and output an event at a timing when the light intensity changes, irrespective of object detection processing or image processing, thereby achieving low power consumption and high speed operation.

To detect more events from an object with an event-based sensor, Japanese Patent Application Publication No. 2020-136958, for example, proposes an event-based sensor that sets event detection probability, based on a result of object detection using pixel value pattern recognition.

However, the temporal resolution of the object detection processing is lower than the temporal resolution of the output data of the event-based sensor. For this reason, with the event-based sensor described above, when a specific region in the pixel array is set based on a detection result of an object, i.e., a subject, to read out event signals in this specific region, a delay in the object detection processing may also cause a delay in reading out the event signals. Additionally, with the above event-based sensor, the object of the detection target may move out of the specific region that is set, whereby an event of the object located outside this specific region may not be read out. As a result, the event-based sensor described above may fail to accurately detect as an event a change in the subject in the pixel array.

SUMMARY OF THE INVENTION

In view of the foregoing challenges, it is an object of the technology of the present disclosure to allow an event-based imaging device to perform event detection on a moving subject with improved accuracy.

According to some embodiments, imaging device includes a pixel portion that includes a plurality of unit pixels and is configured to detect as an event signal a change in a light intensity of each of the unit pixels, an event readout portion configured to read out the event signal from the pixel portion, an output portion configured to output, regarding at least one region relating to the event signal of the pixel portion, motion information relating to motion of the at least one region, and a determination portion configured to determine a predicted region after a change in the at least one region, the predicted region being predicted based on the motion information, wherein the event readout portion is configured to read out the event signal from a unit pixel included in the determined predicted region.

According to some embodiments, an equipment including the imaging device as described above, the equipment further including at least one of: an optical device compatible with the imaging device; a controller configured to control the imaging device; a processing device configured to process a signal output from the imaging device; a display device configured to display information obtained by the imaging device; a storage device configured to store information obtained by the imaging device; and a mechanical device configured to operate based on information obtained by the imaging device.

Further features of the present invention will become apparent from the following description of exemplary embodiments with reference to the attached drawings.

DESCRIPTION OF THE EMBODIMENTS

Figure 1:
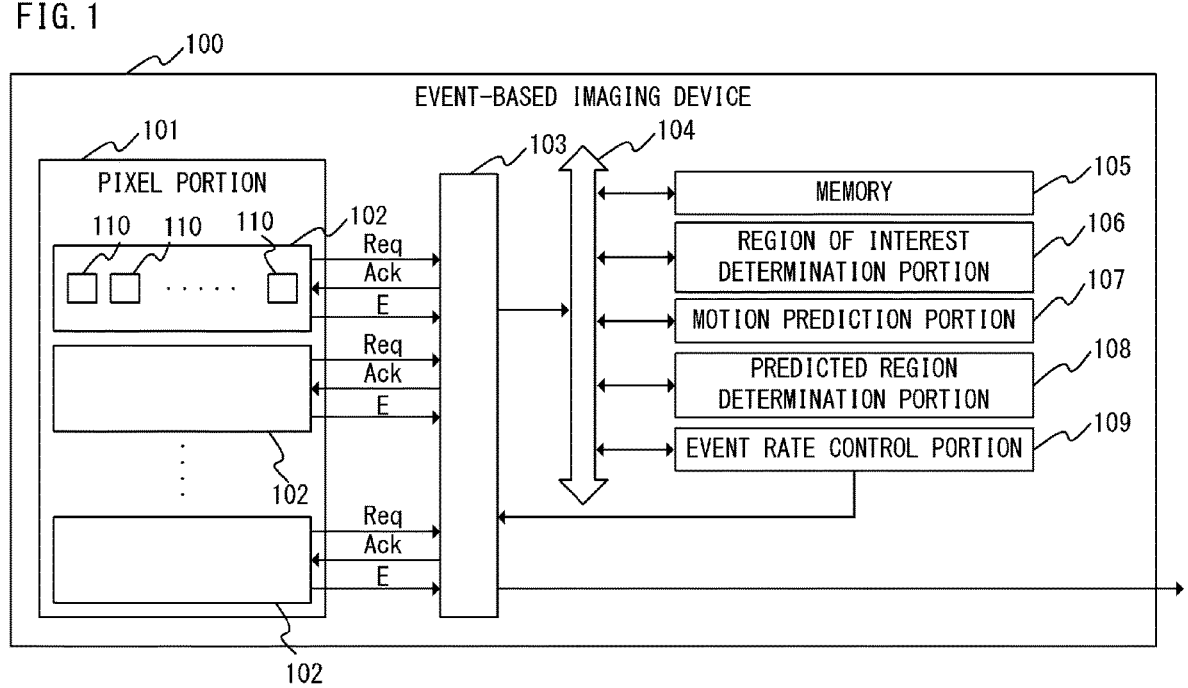
FIG. 1 is a diagram showing a schematic configuration of an imaging device according to a first embodiment.

Referring to the drawings, embodiments of the present disclosure are now described. In each of the embodiments described below, an event-based imaging device is mainly described as an example of a photoelectric conversion device. However, the embodiments are not limited to event-based imaging devices, and can be applied to other examples of photoelectric conversion devices. For example, the embodiments are applicable to distance measuring devices (devices for distance measurement using focus detection and Time of Flight (TOF)), photometry devices (devices for measuring the amount of incident light), and the like.

First Embodiment

FIG. 1 shows a schematic configuration of an event-based imaging device 100 according to a first embodiment. As shown in FIG. 1, the event-based imaging device 100 includes a pixel portion 101, an event readout portion 103, a memory 105, an ROI (Region Of Interest) determination portion 106, a motion prediction portion 107, a predicted region determination portion 108, and an event rate control portion 109.

Figure 2:
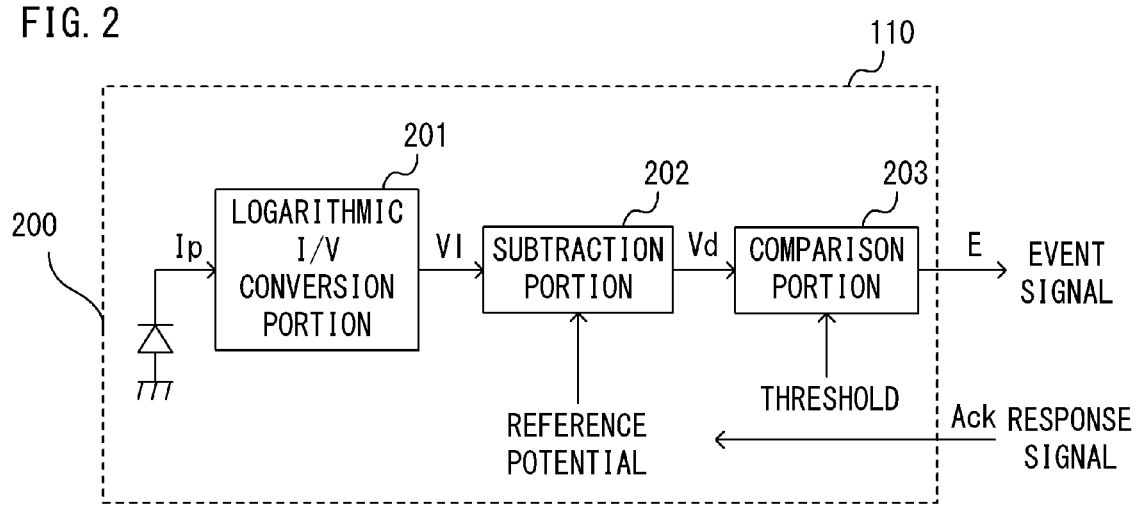
FIG. 2 is a diagram showing a schematic configuration of a pixel according to the first embodiment.

The pixel portion 101 includes a plurality of unit pixels 110 arranged in a two-dimensional array as with a general image sensor, for example. The unit pixels 110 may be arranged in the same manner as a one-dimensional line sensor or in another arrangement. Each unit pixel 110 is a pixel that can detect a change in the intensity of incident light as an event signal, and includes a circuit illustrated in FIG. 2. As shown in FIG. 2, one unit pixel 110 includes a photodiode 200, a logarithmic I/V conversion portion 201, a subtraction portion 202, and a comparison portion 203.

In the unit pixel 110, the photodiode 200 generates a photocurrent $I_p$ according to the intensity of incident light. For example, the logarithmic I/V conversion portion 201 converts the photocurrent $I_p$ into a potential, and obtains the logarithmic potential $V_1$ by conversion using a logarithmic function. The output $V_1$ of the logarithmic I/V conversion portion 201 does not necessarily have to be a logarithmic potential, and may be a potential that changes linearly with the intensity of incident light, or any other value that changes with the light intensity.

The subtraction portion 202 calculates the difference $V_d$ between the logarithmic potential $V_1$ and the reference potential. The comparison portion 203 compares the difference $V_d$ calculated by the subtraction portion with a predetermined threshold. The comparison portion 203 uses two thresholds, a positive threshold T1 and a negative threshold T2. When the difference $V_d$ becomes higher than the positive threshold or lower than the negative threshold, an event signal with a value different from a value of 0 is generated and detected as an event. An event signal E of a pixel P (x, y) at time t can be expressed by the following formula (1).

$$E(x,\ y,\ t) = \begin{cases} 1\ (v_d > T1) \\ -1\ (v_d < T2) \\ 0\ (\text{other than above}) \end{cases} \quad (1)$$

The temporal resolution of event detection of the unit pixel 110 at time t may be 1 µs, for example. When the event signal E has a value of 1, it indicates that a change has occurred in which the unit pixel 110 has become brighter, that is, the occurrence of a positive event. When the event signal E has a value of −1, it indicates that a change has occurred in which the unit pixel 110 has become darker, that is, the occurrence of a negative event.

Formula (1) above is merely an example of the expression of the event signal E. It is also possible to assign different numerical values to a positive event, a negative event, or a state without any event, to handle a positive event and a negative as one type of event signal without distinguishing them, or to use other expressions. An event signal E is generated independently of (asynchronously with) a frame synchronization signal used in a general image sensor. The use of an event signal E enables events to be detected with high temporal resolution. A detected event signal E is sent to the event readout portion 103. The reference potential is updated using a response signal Ack from the event readout portion 103, which will be described below, as a trigger.

The pixel portion 101 is configured to output an event signal transmission request signal Req to the event readout portion 103 on a row-by-row basis. A transmission request signal Req is output from each pixel row 102 when at least one of the unit pixels 110 of the columns of the pixel row 102 detects an event signal, that is, when the value of the event signal E becomes 1 or −1.

In this embodiment, a transmission request is output from the pixel portion 101 on a row-by-row basis. However, the pixel groups may be configured in the units of columns, rectangular regions having a fixed width in the row or column direction, or any other units, and each unit may send a transmission request.

The event readout portion 103 reads out event signals from the pixel portion 101. Specifically, the event readout portion 103 includes an arbitration portion 600, which arbitrates transmission request signals Req from the pixel rows 102 of the pixel portion 101, for example. Details of the arbitration portion 600 will be described below with reference to FIG. 6. The arbitration portion 600 reads out the event signals E of the pixels in the selected pixel row 102. When the event signals E are read out by the arbitration portion 600, the value of the event signal E of each unit pixel 110 in the pixel row 102 is returned to zero.

Then, the event readout portion 103 sends back a response signal Ack to the pixel row 102, and each unit pixel 110 of the pixel row 102 restarts event detection using, as the new reference potential, the logarithmic potential $V_1$ at the time of receiving the response signal Ack. The event signals of the pixel portion 101 read by the event readout portion 103 are used as an input for controlling an event rate as an event readout frequency, which will be described below, and are also used to generate final output data of the event-based imaging device 100. For example, in addition to the polarity (positive or negative of the event signal), information indicating the coordinate values of the unit pixel 110 from which the event signal was read out, the time stamp at the time of readout, and the like is added to each event signal, and these are output as event data from the event readout portion 103. The event readout portion 103 can add the coordinate values and time stamps to the event signal. To add the coordinate values, the position of the row and column directions of the event signal read by the event readout portion 103 are determined. Also, the event readout portion 103 may include a timer circuit (not shown) and add the output value of the timer at the event readout time to the event signal as a time stamp. The event readout portion 103 generates and outputs event data in this manner.

A bus 104 is used for data transfer between the event readout portion 103 and the memory 105, the ROI determination portion 106, the motion prediction portion 107, the predicted region determination portion 108, and the event rate control portion 109, which will be described below.

The memory 105 temporarily stores intermediate data of processing, such as event data output from the event readout portion 103 and input/output data of the ROI determination portion 106, the motion prediction portion 107, the predicted region determination portion 108, and the event rate control portion 109, which will be described below.

The ROI determination portion 106 performs processing for detecting a region of interest from the read event data, such as detecting whether a target of interest (TOI) is present. In the following description, a region of interest detected by the ROI determination portion 106 is referred to as a "preliminary region of interest". This processing may be object detection processing using a convolutional neural network (CNN), for example. The ROI determination portion 106 performs preliminary region of interest detection processing at regular time intervals in accordance with the time required for object detection processing, for example.

However, a CNN requires input data in an array structure, such as frame image data output from a general image sensor as input data. As such, data obtained by converting the output event sequence from the event readout portion 103 into an array structure may be stored in the memory 105, and the ROI determination portion 106 may be configured to read the stored data from the memory 105 and process it.

One example of event sequence array structure representation is the two-dimensional histogram format, which uses the number of events that occurred in the pixel during a specific period as the value corresponding to the pixel value of output image data of a general image sensor. Alternatively, the Time Surface format may also be used in which the latest time stamp of the events that occurred in each pixel is used as the value corresponding to the pixel value of output image data of a general image sensor. These are merely examples, and any methods may be used to convert the event sequence into array-structured data.

Also, the ROI determination portion 106 may output region information of the detected preliminary region of interest and the event rate of the corresponding region, for example. Multiple regions may be detected as preliminary regions of interest.

Figure 3:
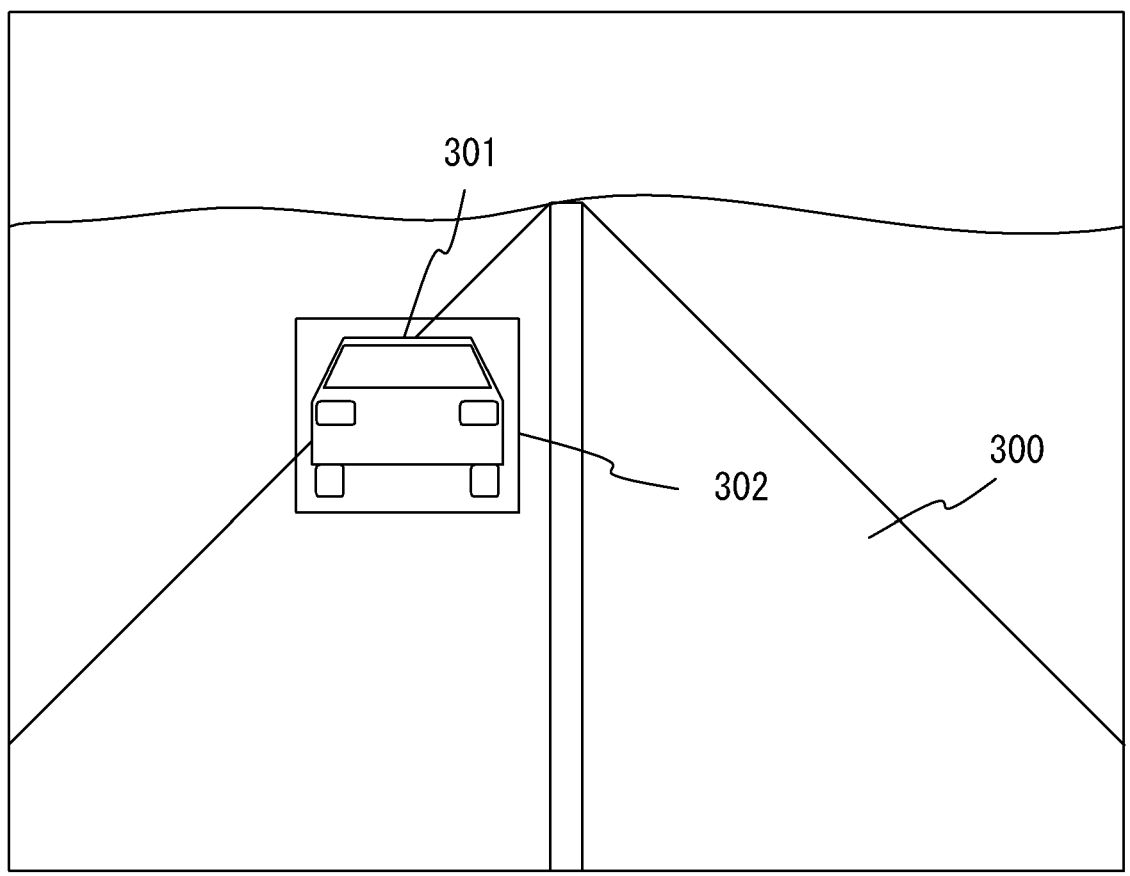
FIG. 3 is a diagram illustrating a region of interest determination processing performed by the imaging device according to the first embodiment.

FIG. 3 is a diagram illustrating an example of a region of interest detected by the above processing. In the example of FIG. 3, a vehicle 301 traveling on a road surface 300 is imaged by the event-based imaging device 100. A preliminary region of interest 302 is a region of interest determined by the ROI determination portion 106 detecting the vehicle 301 as a target of interest (TOI). For example, the region information of the preliminary region of interest 302 may be expressed as a set of values of the upper left coordinates and the lower right coordinates of the preliminary region of interest 302, provided that this region is a rectangular region in the pixel portion 101. The event rate of the events used to determine the preliminary region of interest 302 may be assigned according to the type of the TOI (e.g., person, vehicle, traffic light), and may be a value between 0 and 1, for example. The region of interest determination portion 106 determines the preliminary region of interest 302 by repeatedly performing processing every fixed period of time, for example, every 10 ms.

As described above, the time cycle (for example, 10 ms) for updating the preliminary region of interest 302 is generally greater than the temporal resolution for event detection (for example, 1 µs), but this will not be limiting in achieving the processing of the present embodiment.

The motion prediction portion 107 is an output portion that outputs motion information regarding the motion of each of the preliminary regions of interest output by the ROI determination portion 106. The motion information may include information indicating the type of motion of the event-based imaging device 100, such as two-dimensional translation (x-axis direction (horizontal direction) and y-axis direction (vertical direction)), rotation, yaw, pitch, and zoom. Additionally or alternatively, the motion information may include information indicating the type of motion of the TOI imaged by the event-based imaging device 100, such as two-dimensional translation (x-axis direction (horizontal direction) and y-axis direction (vertical direction)), rotation, yaw, pitch, and zoom. Additionally or alternatively, the motion information may include information indicating the amount of motion, such as the speed or acceleration of the target.

On the basis of the region information of the preliminary region of interest 302 output by the ROI determination portion 106 and the motion information output by the motion prediction portion 107, the predicted region determination portion 108 determines a predicted region that will be present after the preliminary region of interest has changed between the current time and a future time. The predicted region determination portion 108 outputs the region information of the determined predicted region.

Figure 4A:
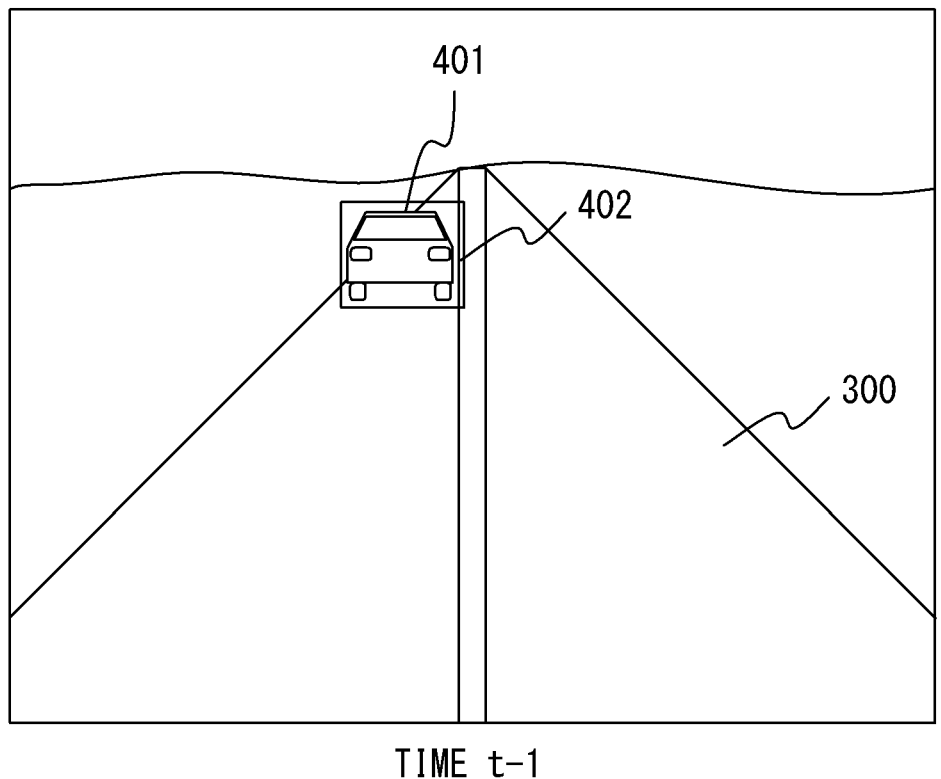
FIGS. 4A and 4B are diagrams illustrating motion prediction processing performed by the imaging device according to the first embodiment.
Figure 4B:
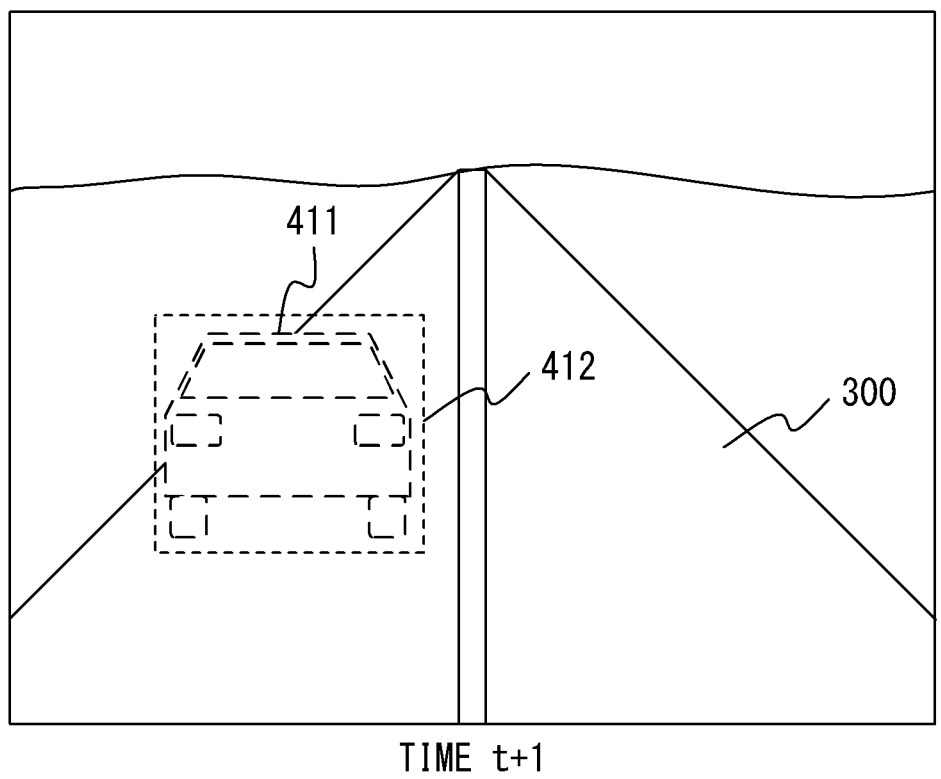

Referring to the example shown in FIG. 3, FIG. 4A and FIG. 4B, the processing of the motion prediction portion 107 is now described. The time of the time point of FIG. 3 is defined as a current time t, and the time of the time point at which a preliminary region of interest is calculated immediately before the time point of FIG. 3 (time t) is defined as a past time t−1. Also, the time of the time point at which a preliminary region of interest is calculated immediately after the time point of FIG. 3 (time t) is defined as a future time t+1.

FIG. 4A shows an example of a vehicle 401 and a preliminary region of interest 402 at time t−1. In FIG. 4A, the vehicle 401 imaged by the event-based imaging device 100 and the preliminary region of interest 402 determined by the ROI determination portion 106 are each shown as rectangular regions. FIG. 4B shows an example of a vehicle 411 and a predicted region 412 at time t+1 predicted by the predicted region determination portion 108 based on the motion information output by the motion prediction portion 107. In FIG. 4B, the vehicle 401 imaged by the event-based imaging device 100 and the preliminary region of interest 402 determined by the ROI determination portion 106 are each shown as rectangular regions indicated by broken lines. The preliminary region of interest 402 determined by the ROI determination portion 106, which is a first region determination portion, at time t−1 is an example of a first region.

The motion prediction portion 107 calculates an optical flow using the region information of the preliminary region of interest 402 at time t−1 and the events detected by the event-based imaging device 100 between time t−1 and time t. The optical flow is vector information that represents changes in each pixel or each region of interest, and is calculated based on changes in the positions of events that occur within a specific period in a specific region. Furthermore, the motion prediction portion 107 calculates the type and/or amount of motion of the preliminary region of interest 402 from the optical flow. The motion prediction portion 107 calculates the region information of the predicted region 412 at future time t+1 by interpolating changes in the preliminary region of interest 402 up to time t+1 using the optical flow. The predicted region 412 at time t+1 is an example of a predicted region at time t+1 after a change in the first region determined by the predicted region determination portion 108, which is the second region determination portion.

In the event-based imaging device 100, the method for calculating the optical flow from the event signals detected by the pixel portion 101 and the method for calculating the type and amount of motion of the preliminary region of interest from the optical flow may be achieved using known algorithms. The methods described herein are merely examples, and any other methods may be used to obtain the type and amount of motion of the region of interest based on the event signals detected by the pixel portion and the event data generated by the event readout portion.

Figure 5A:
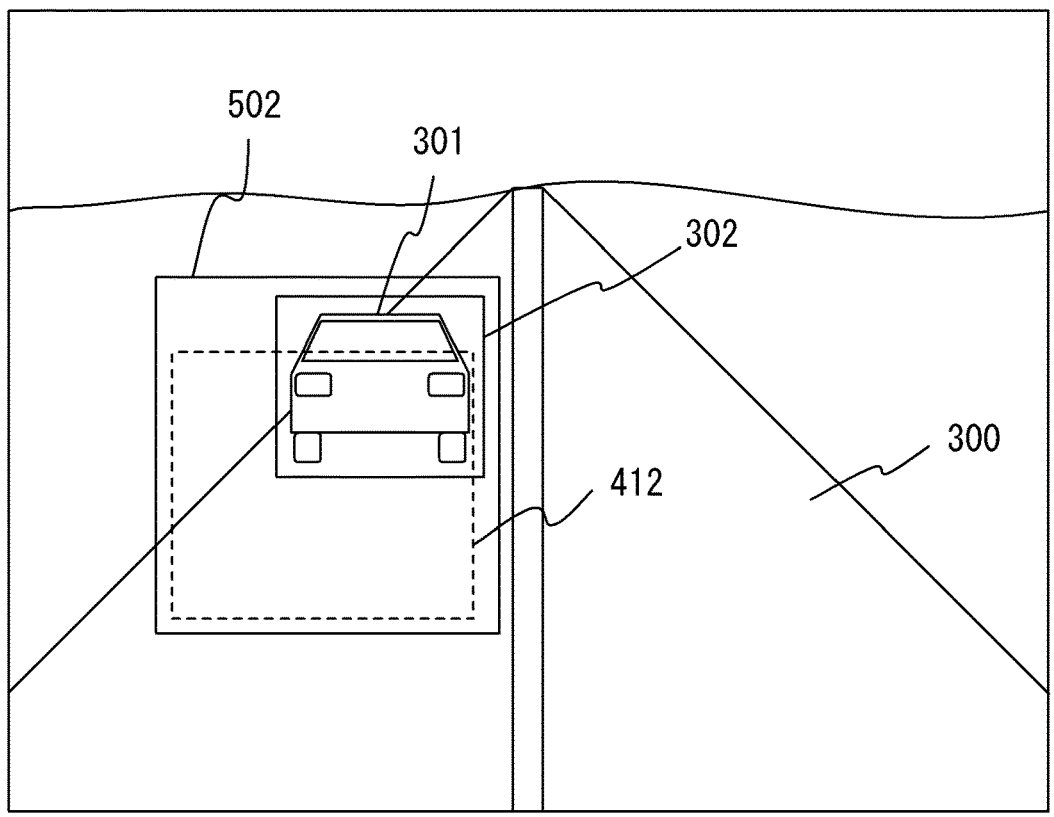
FIGS. 5A and 5B are diagrams illustrating predicted region determination processing performed by the imaging device according to the first embodiment.

FIG. 5A shows an example of a predicted region determined by the predicted region determination portion 108 in the example shown in FIGS. 3, 4A and 4B. In FIG. 5A, the predicted region 412 shown in FIG. 4B is shown in the image shown in FIG. 3. For example, the predicted region determination portion 108 outputs the region information of the smallest rectangular region including the preliminary region of interest 302 at the current time t and the predicted region 412 at the future time t+1 as the region information of the predicted region after a change in the region of interest. FIG. 5A also shows this predicted region 502.

Figure 5B:
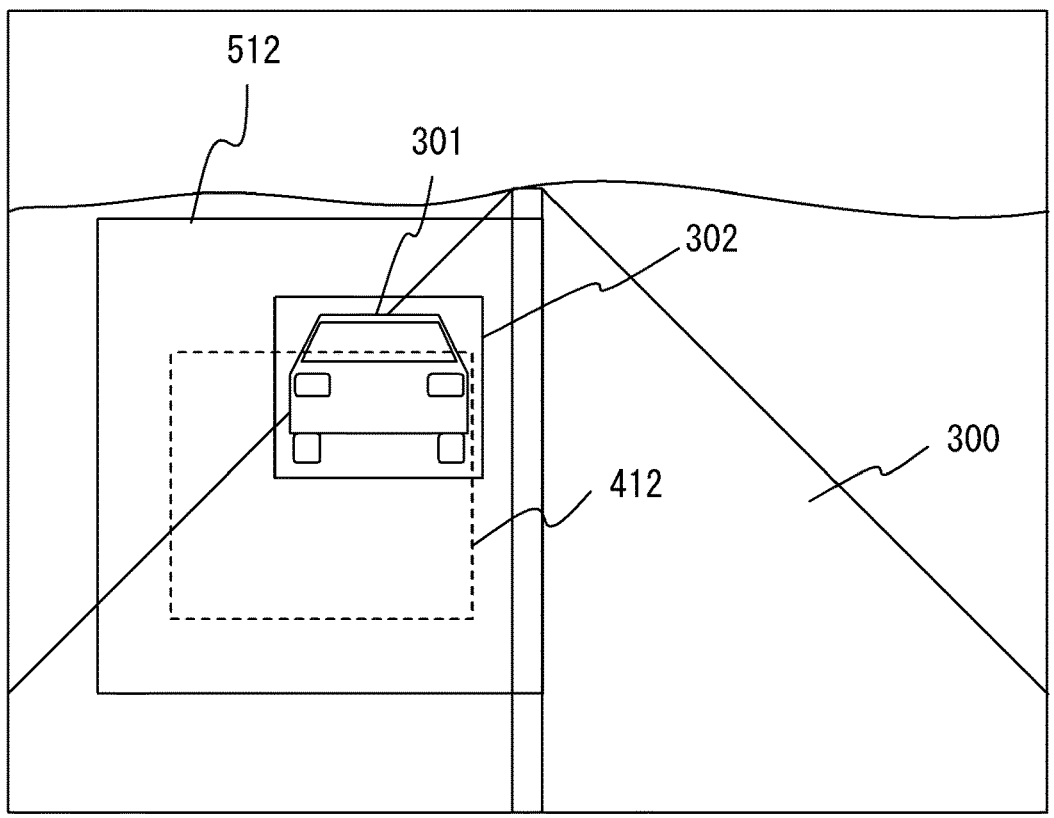

However, the above method for calculating the predicted region 502 is merely an example, and the predicted region determination portion 108 may calculate the confidence of the motion prediction of the preliminary region of interest by the motion prediction portion 107, for example. In this case, when the calculated confidence is lower than a predetermined threshold, the predicted region determination portion 108 may use, instead of the predicted region 502, a predicted region 512 obtained by adding margins to the top, bottom, left, and right of the predicted region 502 in FIG. 5A, as shown in FIG. 5B. Here, the value of confidence of motion prediction may be set to be higher when the difference between the predicted region at the current time, which is predicted based on the past preliminary region of interest and motion information, and the preliminary region of interest at the current time is smaller. Examples of the difference between the predicted region and the preliminary region of interest include a difference in coordinates of the regions, a difference in width of the regions in the x-axis direction, and a difference in width of the regions in the y-axis direction.

The event rate control portion 109 controls the event rate, which is the frequency at which the event readout portion 103 reads out events in the predicted region, based on the region information of each predicted region.

Figure 6:
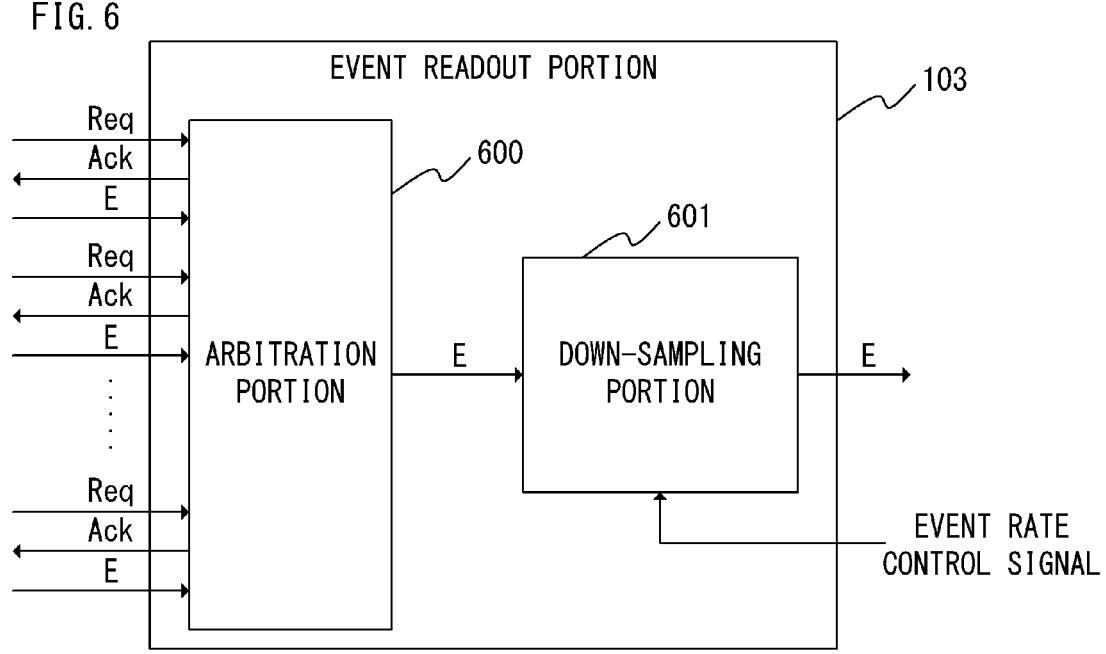
FIG. 6 is a diagram illustrating a schematic configuration of an event readout portion of the imaging device according to the first embodiment.

FIG. 6 shows an example of the configuration of the event readout portion 103. As shown in FIG. 6, the arbitration portion 600 arbitrates transmission request signals Req output for the respective rows of the pixel portion 101. More specifically, in the order of reception of transmission request signals Req, the arbitration portion 600 repeatedly reads the events of the corresponding row, returns a response signal Ack, and outputs the read events to the subsequent step, for example.

The arbitration processing by the arbitration portion 600 described above is not limited to this, and the arbitration portion 600 may sequentially check for a transmission request from the top row of the pixel portion 101 and sequentially read out the rows with transmission requests.

In accordance with the event rate control signal input from the event rate control portion 109, a down-sampling portion 601 down-samples the event signals E output from the arbitration portion 600 in a spatial direction (for example, row direction or column direction) or a temporal direction, and output the signals.

Referring to FIG. 5A, an example of event rate control is now described. Here, assume that the event rate for the region of interest of the vehicle imaged by the event-based imaging device 100 is set to 1, and the event rate for the region outside the region of interest is set to 0.2. These event rate setting values are merely examples, and may be set freely corresponding to the type of subject of the region of interest.

In the example of FIG. 5A, since the event rate setting value for the predicted region 502 is 1, the event rate control portion 109 controls the down-sampling portion 601 so as not to down-sample the event signals of that region output from the arbitration portion 600. As for the region other than the predicted region 502, since the event rate setting value is 0.2, the event rate control portion 109 controls the down-sampling portion 601 so as to output 20% of the event signals of that region output from the arbitration portion 600.

For example, the event rate control portion 109 notifies the down-sampling portion 601 of a row direction down-sampling rate, a column direction down-sampling rate, and a temporal direction down-sampling rate. Specifically, the event rate control portion 109 adjusts the down-sampling rates so as to satisfy the following formula (2) where $C_y$ is the row direction down-sampling rate, $C_x$ is the column direction down-sampling rate, and $C_t$ is the temporal direction down-sampling rate, and the down-sampling portion 601 is notified of these down-sampling rates.

$$(1 - C_y) \times (1 - C_x) \times (1 - C_t) = 0.2 \qquad (2)$$

According to the down-sampling rates adjusted as described above, the down-sampling portion 601 down-samples the event signals of rows and columns and time stamps using a fixed pattern. In another example, the down-sampling portion 601 may perform down-sampling using a random pattern that probabilistically determines whether to down-sample relevant rows, columns, and time stamps.

In this embodiment, intermediate data of processing by each processing portion is temporarily held in the memory 105, but this is not an essential configuration for implementing this embodiment. It may be configured that the data from processing portions is exchanged directly between processing portions without being held by the memory 105. For example, a spiking neural network (SNN) can use, as an input signal, an event signal generated as a time-series spike signal, and can also be used for the object detection processing in this embodiment. Accordingly, the event data output by the event readout portion 103 may be directly input in chronological order to the ROI determination portion 106 for performing object detection using the SNN. Similarly, the motion prediction portion 107, the predicted region determination portion 108, and the event rate control portion 109 can also perform the above processing by processing inputs in chronological order without using the memory 105.

Also, the above description assumes that the region of interest determination portion 106, the motion prediction portion 107, the predicted region determination portion 108, and the event rate control portion 109 are arranged within the event-based imaging device 100. However, these processing portions may be placed outside the event-based imaging device 100. In this case, event data is transmitted from the event-based imaging device 100 to an information processing device (not shown) via an external interface, and the information processing device that has received the event data performs the above-mentioned predicted region determination processing. Then, the event rate control signal is fed back to the event-based imaging device 100 to perform the event rate control according to the present invention. The placement of any of the processing portions outside the event-based imaging device 100 may be determined as appropriate.

The above is the description of the event-based imaging device 100 according to the present embodiment. With an event-based imaging device of conventional art, when an event signal is generated, the event detection circuit of each pixel issues a signal requesting the arbitration portion to read out the event signal, and the arbitration portion selects the row to be read out. However, since the event signal is read out row by row, when transmission request signals are issued from two or more rows, there will be pixels that have to wait for their event signals to be read by the arbitration portion. In particular, when the event-based imaging device is mounted on a movable member, events can be detected from all positions within the field of view of the event-based imaging device. As such, when the number of rows in the pixel portion is 720, a pixel may have to wait for a time corresponding to 720×H at maximum. Here, H is the time required to read out events of one row of the pixel portion. For example, when H=1.2 μs, a standby time (delay time) of slightly under 1 ms occurs in the above example.

Also, with an event-based imaging device of conventional art, even when the temporal resolution of the time stamp added to the event signal is high, such as 1 μs, the amount of time required to wait for readout causes an error of the time stamp. In other words, the temporal resolution of the time stamp is equivalent to 1 ms, and the low latency performance of the event-based imaging device (corresponding to the frame rate in a general image sensor) is degraded. Furthermore, artifacts due to time stamp errors may occur (for example, what is actually a straight line may be observed as a curved line). Artifacts may reduce the recognition accuracy of the TOI of the event-based imaging device, for example. Furthermore, when a transmission request signal is issued and then another event occurs in the same pixel before the previous event is read out, the previous event signal may be lost.

In contrast, the event-based imaging device 100 of this embodiment can determine the predicted region based on the motions of the event-based imaging device 100 and the TOI, and continuously capture the TOI within the predicted region. As such, the event detection is reduced for the region of the pixel portion not relating to the TOI, allowing the event detection for the region relating to the TOI to be performed with a higher temporal resolution. Accordingly, the event-based imaging device 100 of this embodiment can reduce the occurrence of time stamp errors and loss of event signals, which are concerns in event-based imaging devices of conventional art. Furthermore, with the event-based imaging device 100 of this embodiment, the reduction in the event detection for the region not relating to the TOI reduces the amount of information. This is expected to provide the effect of reducing power consumption associated with signal transmission.

Second Embodiment

An event-based imaging device according to a second embodiment is now described. In the following descriptions, same reference numerals are given to those components that are the same as the corresponding components of the above embodiment. Such components will not be described in detail.

Figure 7:
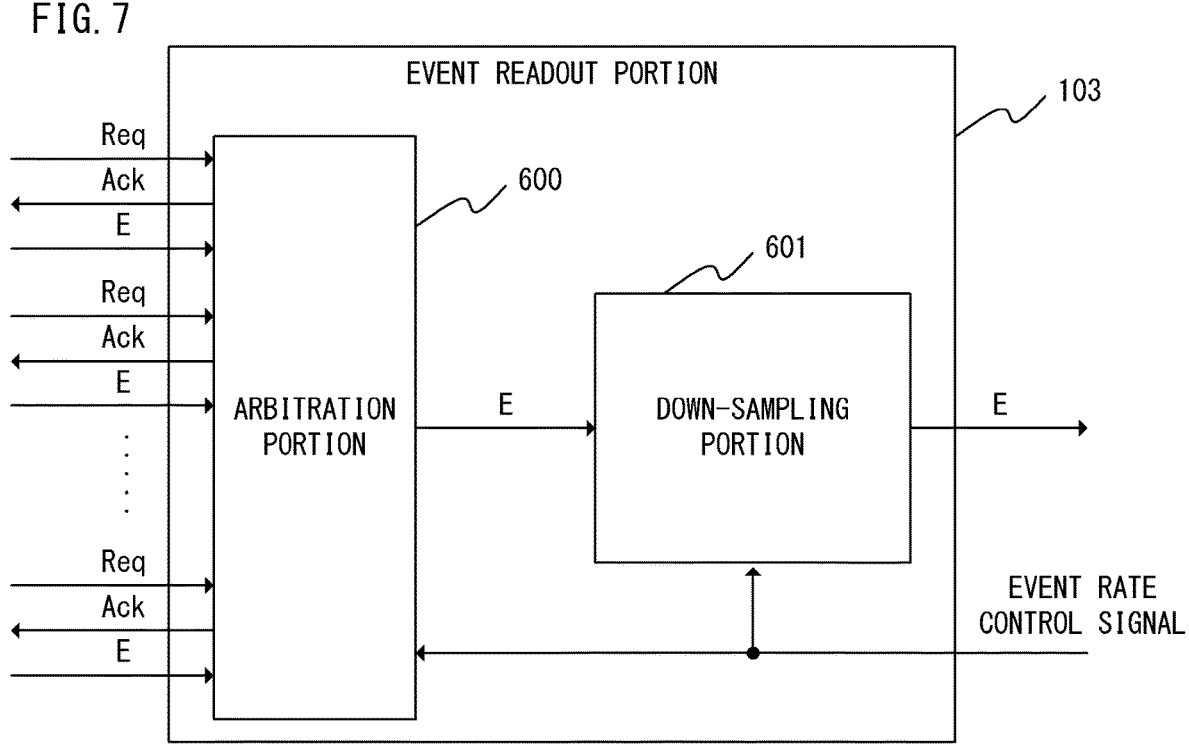
FIG. 7 is a diagram showing a schematic configuration of an event readout portion of an imaging device according to a second embodiment.

The configuration of an event-based imaging device 100 of the present embodiment is similar to the event-based imaging device 100 of the first embodiment shown in FIG. 1. FIG. 7 shows an example of the configuration of the event readout portion 103 of the event-based imaging device 100 according to the present embodiment. As shown in FIG. 7, in the event readout portion 103 of this embodiment, an event rate control signal is input to the arbitration portion 600 and the down-sampling portion 601.

Figure 8:
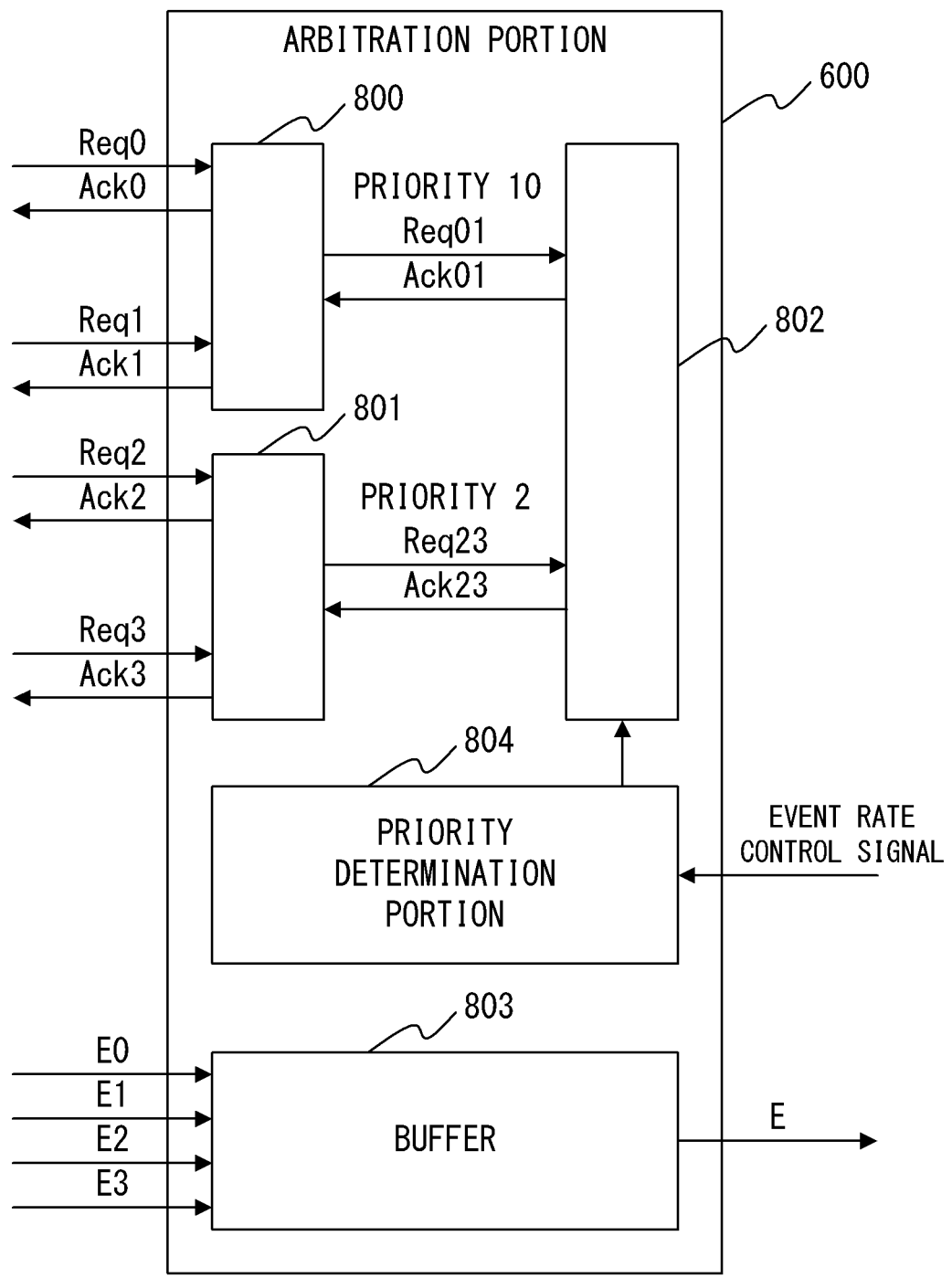
FIG. 8 is a diagram showing a schematic configuration of an arbitration portion of the imaging device according to the second embodiment.

FIG. 8 shows an example of the configuration of the arbitration portion 600 of this embodiment. As shown in FIG. 8, the arbitration portion 600 has a four-input one-output configuration, and outputs the event signal of one selected row while controlling the order of readout of four rows of the pixel portion 101. In the example shown in FIG. 8, the transmission request signals of four rows are Req0, Req1, Req2, and Req3. The response signals corresponding to the respective transmission request signals are Ack0, Ack1, Ack2, and Ack3. The event signals corresponding to the respective transmission request signals are E0, E1, E2, and E3.

An arbitration circuit 800 has a two-input one-output configuration. When transmission request signals Req0 and Req1 are input simultaneously, the arbitration circuit 800 selects one of the transmission request signals and outputs the selected transmission request signal (indicated by Req01 in the figure) to the subsequent step. Likewise, an arbitration circuit 801 selects one of transmission request signals Req2 and Req3 and outputs the selected transmission request signal (indicated by Req23 in the figure) to the subsequent step.

Transmission request signals Req01 and Req23 from the arbitration circuits 800 and 801, respectively, are input to an arbitration circuit 802, which outputs corresponding response signals Ack01, Ack23 to the arbitration circuits 800, 801. The arbitration circuit 802 selects one of transmission request signals Req01 and Req23, and returns response signal Ack01 or Ack23 corresponding to the selected transmission request signal. The arbitration circuit 800 that has received Ack01, or the arbitration circuit 801 that has received Ack23, sends one of response signals Ack0, Ack1, Ack2, and Ack3 corresponding to the transmission request signal selected when outputting transmission request signal Req01 or Req23 to the pixel portion 101. For example, when the arbitration circuit 800 selects transmission request signal Req1 and outputs transmission request signal Req01 to the subsequent step, it outputs response signal Ack1 corresponding to transmission request signal Req1 to the pixel portion 101.

In this manner, the response signal is sent back in the reverse direction of the transmission request signal relayed from the arbitration circuit of the previous step, and the row to be read out is determined. Then, the event signals of the pixels of the single row that has received the response signal are stored in a buffer 803. The buffer 803 sequentially outputs the event signal of one row to the subsequent step. In the example shown in FIG. 8, the arbitration circuits 800, 801, and 802 arbitrate transmission request signals by selecting transmission request signals according to the ratio of priority values. In one example, in the arbitration circuit 800, the priorities in selecting transmission request signals Req0 and Req1 are both fixed to 1, that is, the ratio of priority values is fixed to "Req0:Req1=1:1". As such, when both Req0 and Req1 are input, the arbitration circuit 800 performs arbitration such that Req0 and Req1 are output to the subsequent arbitration circuit 802 with the same frequency. Also, in the arbitration circuit 801, the priorities in selecting transmission request signals Req2 and Req3 are both fixed at 1, that is, the ratio of priority values is fixed at "Req2:Req3=1:1".

In the arbitration circuit 802, the priorities in selecting transmission request signals Req01 and Req23 are such that Req01 has a priority of 10 and Req23 has a priority of 2, that is, the priority value ratio is "Req01:Req23=10:2". Accordingly, when both Req01 and Req23 are input, the arbitration circuit 802 arbitrates so that Req23 is selected twice while Req01 is selected ten times. As shown in the figure, a priority determination portion 804 sets the priority of each of signals Req01 and Req23 of the arbitration circuit 802 in accordance with the event rate control signal input from the event rate control portion 109.

In the above example, event signals E0 and E1 of the upper two rows of the pixel portion 101 are output from the buffer 803 of the arbitration portion 600 more frequently than event signals E2 and E3 of the lower two rows of the pixel portion 101. The down-sampling portion 601 performs the same down-sampling as in the first embodiment in the column direction and the temporal direction. In the above example, it is assumed that the number of rows of the pixel portion 101 input to the arbitration portion 600 is four, but the number of rows may be any number. Also, it is assumed that the arbitration circuits forming the arbitration portion 600 have a two-step configuration consisting of the first-step arbitration circuits 800 and 801 and the second-step arbitration circuit 802, but the number of steps of the arbitration circuits may be changed according to the number of rows of transmission request signals input from the pixel portion 101. The arbitration circuits may also be configured such that transmission request signals of three or more rows are input to one arbitration circuit. Furthermore, the priority determination portion 804 sets the priority only for the arbitration circuit 802. Additionally or alternatively, the priority determination portion 804 may be configured to set the priority for the arbitration circuit 800 and/or the arbitration circuit 801.

In the same manner as the first embodiment, the present embodiment assumes that transmission request signals Req0, Req1, Req2, and Req3 are input to the arbitration portion 600 in units of rows of the pixel portion 101. However, it may be configured that transmission request signals are input to the arbitration portion 600 in units of columns, units of rectangular regions having a fixed width in the row direction and a fixed width in the column direction, as well as pixel groups of any units of the pixel portion 101.

Furthermore, the event readout portion 103 of this embodiment may be configured so as not to have the down-sampling portion 601. When the down-sampling portion 601 is not used, the arbitration portion 600 performs the above event rate control in accordance with the event rate control signal.

As described above, according to the present embodiment, the arbitration portion 600 can control the readout frequency of event signals detected by the pixel portion 101 for each pixel group (e.g., row units, column units, or rectangular region units) of the pixel portion 101. In the first embodiment, the down-sampling portion 601 down-samples event signals, so that some of the event signals input to the event readout portion 103 are discarded and not output to the subsequent step. In contrast, in the present embodiment, the event signals that are not output from the event readout portion 103 to the subsequent step are controlled so as not to be input to the event readout portion 103 through arbitration by the arbitration portion 600. As a result, as compared with the first embodiment, the event-based imaging device 100 of the present embodiment can further reduce processing delays caused by event signal readout.

Third Embodiment

An event-based imaging device according to a third embodiment is now described. In the following descriptions, same reference numerals are given to those components that are the same as the corresponding components of the above embodiments. Such components will not be described in detail.

The configuration of an event-based imaging device 100 of the present embodiment is similar to the event-based imaging device 100 of the first embodiment shown in FIG. 1. In this embodiment, the processing of the event rate control portion 109 differs from the processing of the event rate control portion 109 in the first embodiment. Referring to FIG. 5A, the processing of the event rate control portion 109 in the present embodiment is now described.

In this embodiment, the event rate control portion 109 controls the event rate according to the area ratio between the preliminary region of interest 302 calculated by the ROI determination portion 106 and the predicted region 502 calculated by the predicted region determination portion 108.

Specifically, the first event rate corresponding to the preliminary region of interest 302 is $I_1$, the second event rate corresponding to the predicted region 502 is $I_2$, the area of the preliminary region of interest 302 is $S_1$, and the area of the predicted region 502 is $S_2$. Event rate $I_1$ is an example of the first readout frequency, and event rate $I_2$ is an example of the second readout frequency. $I_2$ can be calculated using the following formula (3).

$$I_2 = \frac{S_1}{S_2} I_1 \tag{3}$$

In this manner, the event rate control portion 109 can control such that a larger area $S_2$ relative to the area $S_1$ results in a smaller event rate $I_2$.

The event rate control method using formula (3) above is merely an example, and other calculation formulas or processing methods may be used as long as event rate $I_2$ is controlled to be smaller when the value of area $S_2$ relative to area $S_1$ is greater.

In the example of FIG. 5A, a higher speed of the motion of the vehicle 301 results in a larger proportion of the predicted region 502 in the whole captured image, resulting in a larger area $S_2$. In this situation, if the first event rate $I_1$ is applied to the predicted region 502, the number of event signals generated in the pixel portion 101 would increase, resulting in time stamp errors or unintended event loss in event detection of the predicted region 502. However, in the present embodiment, the event rate control portion 109 adaptively lowers the second event rate $I_2$ according to the area $S_2$, thereby reducing the number of events detected by the pixel portion 101 as compared with the first embodiment. Moreover, the present embodiment is expected to have the effect of reducing time stamp errors and event loss associated with event detection.

Fourth Embodiment

Figure 9:
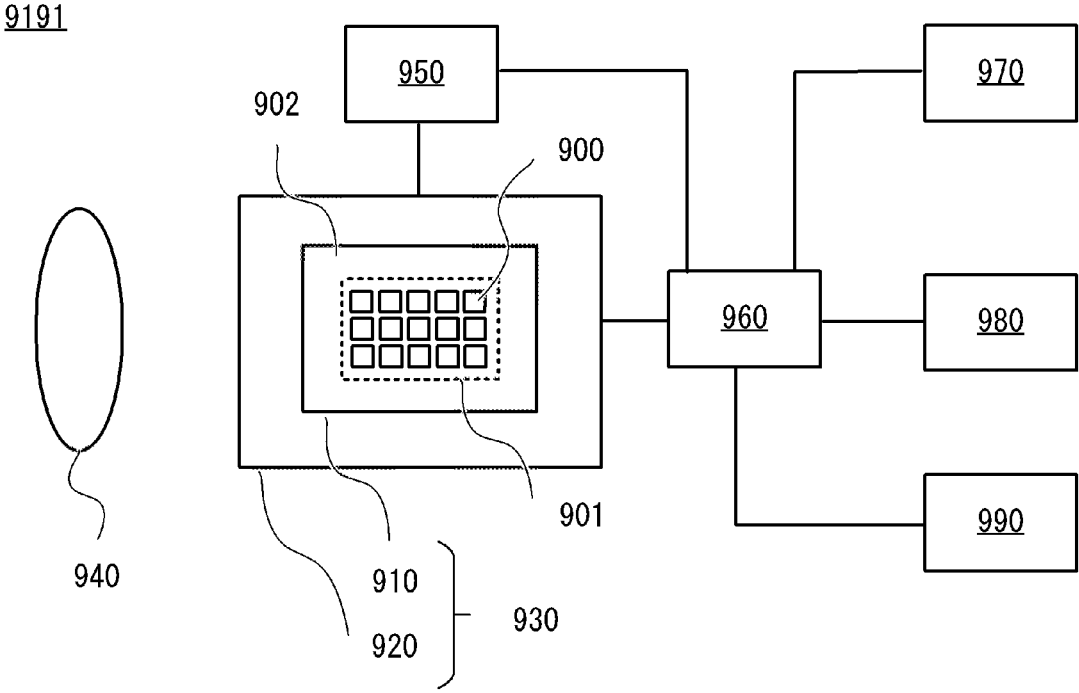
FIG. 9 is a diagram showing a schematic configuration of an equipment including a semiconductor device according to an embodiment.

Any of the first to third embodiments described above can be applied to a fourth embodiment. FIG. 9 is a schematic view for explaining equipment 9191 including a semiconductor apparatus 930 of the present embodiment. The semiconductor apparatus 930 can be any of the imaging devices described in the first to third embodiments, or an imaging device obtained by combining a plurality of the embodiments. The equipment 9191 including the semiconductor apparatus 930 will be described in detail. As described above, the semiconductor apparatus 930 can include a semiconductor device 910 having a semiconductor layer, and a package 920 which houses the semiconductor device 910. The package 920 can include a substrate to which the semiconductor device 910 is fixed, and a lid made of glass or the like which faces the semiconductor device 910. The package 920 can further include a joining member such as a bonding wire or a bump which connects a terminal provided on the substrate and a terminal provided on the semiconductor device 910.

The equipment 9191 can include at least any of an optical device 940, a control device 950, a processing device 960, a display device 970, a storage device 980, and a mechanical device 990. The optical device 940 is compliant with the semiconductor apparatus 930. The optical device 940 is, e.g., a lens, a shutter, or a mirror. The control device 950 controls the semiconductor apparatus 930. The control device 950 is a semiconductor apparatus such as, e.g., an ASIC.

The processing device 960 processes a signal output from the semiconductor apparatus 930. The processing device 960 is a semiconductor apparatus such as a CPU or an ASIC for constituting an AFE (analog front end) or a DFE (digital front end). The display device 970 is an EL display device or a liquid crystal display device which displays information (image) obtained by the semiconductor apparatus 930. The storage device 980 is a magnetic device or a semiconductor device which stores information (image) obtained by the semiconductor apparatus 930. The storage device 980 is a volatile memory such as an SRAM or a DRAM, or a non-volatile memory such as a flash memory or a hard disk drive.

The mechanical device 990 has a moving unit or a propulsive unit such as a motor or an engine. In the equipment 9191, a signal output from the semiconductor apparatus 930 is displayed in the display device 970, and is transmitted to the outside by a communication device (not shown) provided in the equipment 9191. In order to do so, it is preferable that the equipment 9191 further includes the storage device 980 and the processing device 960 in addition to a storage circuit and an operation circuit of the semiconductor apparatus 930. The mechanical device 990 may also be controlled based on a signal output from the semiconductor apparatus 930.

In addition, the equipment 9191 is suitably used as electronic equipment such as an information terminal having photographing function (e.g., a smartphone or a wearable terminal) or a camera (e.g., an interchangeable-lens camera, a compact camera, a video camera, or a surveillance camera). The mechanical device 990 in the camera can drive components of the optical device 940 for zooming, focusing, and shutter operation. Alternatively, the mechanical device 990 in the camera can move the semiconductor apparatus 930 for vibration isolation operation.

The equipment 9191 can be transport equipment such as a vehicle, a ship, or a flight vehicle. The mechanical device 990 in the transport equipment can be used as a moving device. The equipment 9191 serving as the transport equipment is suitably used as equipment which transports the semiconductor apparatus 930, or performs assistance and/or automation of driving (manipulation) with photographing function. The processing device 960 for assistance and/or automation of driving (manipulation) can perform processing for operating the mechanical device 990 serving as the moving device based on information obtained in the semiconductor apparatus 930. Alternatively, the equipment 9191 may also be medical equipment such as an endoscope, measurement equipment such as a distance measurement sensor, analysis equipment such as an electron microscope, office equipment such as a copier, or industrial equipment such as a robot.

According to the fourth embodiment, it becomes possible to obtain excellent pixel characteristics. Consequently, it is possible to enhance the value of the semiconductor apparatus 930. At least any of addition of function, an improvement in performance, an improvement in characteristics, an improvement in confidence, an improvement in product yield, a reduction in environmental load, a reduction in cost, a reduction in size, and a reduction in weight corresponds to the enhancement of the value thereof mentioned herein.

Consequently, if the semiconductor apparatus 930 according to the fourth embodiment is used in the equipment 9191, it is possible to improve the value of the equipment as well. For example, when the semiconductor apparatus 930 is mounted on transport equipment and photographing of the outside of the transport equipment or measurement of an external environment is performed, it is possible to obtain excellent performance. Therefore, when the transport equipment is manufactured and sold, it is advantageous to determine that the semiconductor apparatus 930 according to the fourth embodiment is mounted on the transport equipment in terms of increasing the performance of the transport equipment itself. The semiconductor apparatus 930 is suitably used particularly as the transport equipment which performs driving assistance and/or automated driving of the transport equipment by using information obtained by the semiconductor apparatus 930.

The embodiments described above can be modified as appropriate without departing from the technical idea. Additionally, the disclosure of the present specification encompasses not only the items specified herein but also all items identifiable from the descriptions in this specification and the drawings attached to this specification. The disclosure of this specification also includes a complement of the concepts described herein. That is, when there is a description in the present specification that "A is greater than B", for example, even if the description that "A is not greater than B" is omitted, the present specification is understood to disclose that "A is not greater than B". This is because the description that "A is greater than B" is premised on that "A is not greater than B" is taken into consideration.

The technology of the present disclosure allows an event-based imaging device to perform event detection on a moving subject with improved accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-039730, filed on Mar. 14, 2023, which is hereby incorporated by reference herein in its entirety.

What is claimed is:

1. An imaging device comprising:
   a pixel portion that includes a plurality of unit pixels and is configured to detect as an event signal a change in a light intensity of each of the unit pixels;
   an event readout portion configured to read out the event signal from the pixel portion;
   an output portion configured to output, regarding at least one region relating to the event signal of the pixel portion, motion information relating to motion of the at least one region; and
   a determination portion configured to determine a predicted region after a change in the at least one region, the predicted region being predicted based on the motion information,
   wherein the event readout portion is configured to read out the event signal from a unit pixel included in the determined predicted region,
   the determination portion includes:
      a first region determination portion configured to determine at least one region in the pixel portion based on the event signal read by the event readout portion; and a second region determination portion configured to determine, based on the at least one region determined by the first region determination portion and the motion information, a predicted region after a change in the at least one region, the output portion is configured to output confidence of the predicted region after the change in the at least one region determined by the determination portion, the second region determination portion is configured to adjust the predicted region after the change in the at least one region based on the confidence, and the confidence decreases as a difference between the predicted region of the first region output by the output portion and the at least one region determined by the first region determination portion at the current time increases.

2. The imaging device according to claim 1, further comprising a control portion configured to control a readout frequency of the event signal for one region or each of a plurality of regions of the at least one region based on the determined predicted region, wherein the event readout portion is configured to read out the event signal from a unit pixel included in the predicted region of the one region or each of the plurality of regions of the at least one region based on the readout frequency controlled by the control portion.

3. The imaging device according to claim 1, wherein a time cycle for determination of the predicted region by the determination portion is greater than a temporal resolution for detection of the event signal by the pixel portion.

4. The imaging device according to claim 1, wherein the motion information includes at least one of a type of motion and an amount of motion of the at least one region.

5. The imaging device according to claim 4, wherein the type of motion includes at least one of horizontal movement, vertical movement, yaw, pitch, zoom, and rotation of the imaging device.

6. The imaging device according to claim 4, wherein the amount of motion includes at least one of a speed of motion and an acceleration of motion of the imaging device.

7. The imaging device according to claim 1, wherein the event readout portion is configured to generate event data by using the event signal and coordinate values indicating a position of the unit pixel that has output the event signal, and the first region determination portion is configured to determine the at least one region in the pixel portion by using the event data.

8. The imaging device according to claim 1, wherein the output portion is configured to output a predicted region of a first region that is predicted based on the first region determined by the first region determination portion at a past time prior to a current time and the motion information output by the output portion for the event signal read out by the event readout portion between the past time and the current time, and the second region determination portion is configured to determine a region, which includes the at least one region determined by the first region determination portion at the current time and the predicted region after a change in the first region, as a predicted region after a change in the at least one region.

9. The imaging device according to claim 7, wherein the output portion is configured to output a predicted region of a first region that is predicted based on the first region determined by the first region determination portion at a past time prior to a current time and the motion information output by the output portion in the event data generated by the event readout portion between the past time and the current time, and the second region determination portion is configured to determine a region, which includes the at least one region determined by the first region determination portion at the current time and the predicted region after a change in the first region, as a predicted region after a change in the at least one region.

10. The imaging device according to claim 7, wherein the output portion is configured to output confidence of the predicted region after the change in the at least one region determined by the determination portion, and the second region determination portion is configured to adjust the predicted region after the change in the at least one region based on the confidence.

11. The imaging device according to claim 1, wherein the second region determination portion is configured to perform adjustment such that an area of the predicted region after the change in the at least one region is larger when the confidence is lower.

12. The imaging device according to claim 10, wherein the second region determination portion is configured to perform adjustment such that an area of the predicted region after the change in the at least one region is larger when the confidence is lower.

13. The imaging device according to claim 1, wherein the event readout portion is configured to read out the event signal by down-sampling the event signal in at least one direction of a spatial direction and a temporal direction based on a readout frequency for each of the at least one region.

14. The imaging device according to claim 2, further comprising an arbitration portion configured to arbitrate an order, in which event signals are read out from a plurality of pixel groups constituted by one or more unit pixels, wherein the control portion is configured to control a readout frequency of the event signals based on the order arbitrated by the arbitration portion.

15. An imaging device comprising:

a pixel portion that includes a plurality of unit pixels and is configured to detect as an event signal a change in a light intensity of each of the unit pixels;

an event readout portion configured to read out the event signal from the pixel portion;

an output portion configured to output, regarding at least one region relating to the event signal of the pixel portion, motion information relating to motion of the at least one region;

a determination portion configured to determine a predicted region after a change in the at least one region, the predicted region being predicted based on the motion information; and a control portion configured to control a readout frequency of the event signal for one region or each of a plurality of regions of the at least one region based on the determined predicted region, wherein the event readout portion is configured to read out the event signal from a unit pixel included in the determined predicted region, the determination portion includes:

a first region determination portion configured to determine at least one region in the pixel portion based on the event signal read by the event readout portion; and a second region determination portion configured to determine, based on the at least one region determined by the first region determination portion and the motion information, a predicted region after a change in the at least one region, and the control portion is configured to assign a first readout frequency to the at least one region determined by the first region determination portion, and assign a second readout frequency, which is obtained by adjusting the first readout frequency according to an area ratio between the at least one region and the predicted region of the at least one region determined by the second region determination portion, to the predicted region of the at least one region.

16. The imaging device according to claim 15, wherein the control portion is configured to reduce the second readout frequency as an area of the predicted region of the at least one region determined by the determination portion relative to the at least one region determined by the determination portion increases.

17. An equipment comprising the imaging device according to claim 1, the equipment further comprising at least one of:
   an optical device compatible with the imaging device;
   a controller configured to control the imaging device;
   a processing device configured to process a signal output from the imaging device;
   a display device configured to display information obtained by the imaging device;
   a storage device configured to store information obtained by the imaging device; and
   a mechanical device configured to operate based on information obtained by the imaging device.

18. An equipment comprising the imaging device according to claim 15, the equipment further comprising at least one of:
   an optical device compatible with the imaging device;
   a controller configured to control the imaging device;
   a processing device configured to process a signal output from the imaging device;
   a display device configured to display information obtained by the imaging device;
   a storage device configured to store information obtained by the imaging device; and
   a mechanical device configured to operate based on information obtained by the imaging device.

* * * * *